(No Model.)  8 Sheets—Sheet 1.

A. H. WOLCOTT.
NAILING MACHINE.

No. 437,073. Patented Sept. 23, 1890.

Fig. 1.

Witnesses
Francis R. Chapman
M. J. Jackson

Inventor
Arthur H. Wolcott
by Alban Andren his atty (No Model.)  A. H. WOLCOTT.  8 Sheets—Sheet 2.
NAILING MACHINE.

No. 437,073.  Patented Sept. 23, 1890.

Fig. 2.

Witnesses
Francis R. Chapman
M. J. Jackson

Inventor.
Arthur H. Wolcott.
by Alban Andrew, his atty.

(No Model.) 8 Sheets—Sheet 3.

A. H. WOLCOTT.
NAILING MACHINE.

No. 437,073. Patented Sept. 23, 1890.

Witnesses
Francis R. Chapman
M. J. Jackson

Inventor
Arthur H. Wolcott
by Alban Andrén, his atty.

(No Model.) 8 Sheets—Sheet 7.

A. H. WOLCOTT.
NAILING MACHINE.

No. 437,073. Patented Sept. 23, 1890.

Witnesses
Francis R. Chapman
M. J. Jackson

Inventor
Arthur H. Wolcott
by VanAndren
his atty.

THE NORRIS PETERS CO., PHOTO-LITHO., WASHINGTON, D. C.

(No Model.) A. H. WOLCOTT. 8 Sheets—Sheet 8.
NAILING MACHINE.

No. 437,073. Patented Sept. 23, 1890.

Fig. 20.

UNITED STATES PATENT OFFICE.

ARTHUR H. WOLCOTT, OF WINTHROP, MASSACHUSETTS.

NAILING-MACHINE.

SPECIFICATION forming part of Letters Patent No. 437,073, dated September 23, 1890.

Application filed December 30, 1889. Serial No. 335,451. (No model.)

*To all whom it may concern:*

Be it known that I, ARTHUR H. WOLCOTT, a citizen of the United States, and a resident of Winthrop, in the county of Suffolk and State of Massachusetts, have invented new and useful Improvements in Nailing-Machines, of which the following, taken in connection with the accompanying drawings, is a specification.

This invention relates to improvements in nailing-machines, and it is particularly designed for the purpose of securing the bristles within the ferrules of brushes; and it consists in the construction, arrangement, and combination of parts, as will hereinafter be more fully shown and described, reference being had to the accompanying drawings, where—

Similar letters and figures refer to similar parts wherever they occur on the different parts of the drawings.

$a$ is the base, to which is secured the frame $b$, in the upper end of which is journaled the driving-shaft $c$, on which is loosely mounted the pulley C, which is set in a rotary motion by means of belt-power applied to it in the usual manner. On the shaft $c$ is secured any well-known form of a cam-clutch $d$, adapted to engage and lock with the pulley C by releasing a spring-pressed pawl D on said clutch, Figs. 14 and 15, when the treadle of the machine is depressed. I wish to state that such cam-clutch forms no part of my present invention and it need not here be described in detail, as any clutch of well-known form may be used for intermittently connecting and disconnecting the loose pulley C to and from the driving-shaft $c$ without departing from the spirit of my invention.

Figure 9:
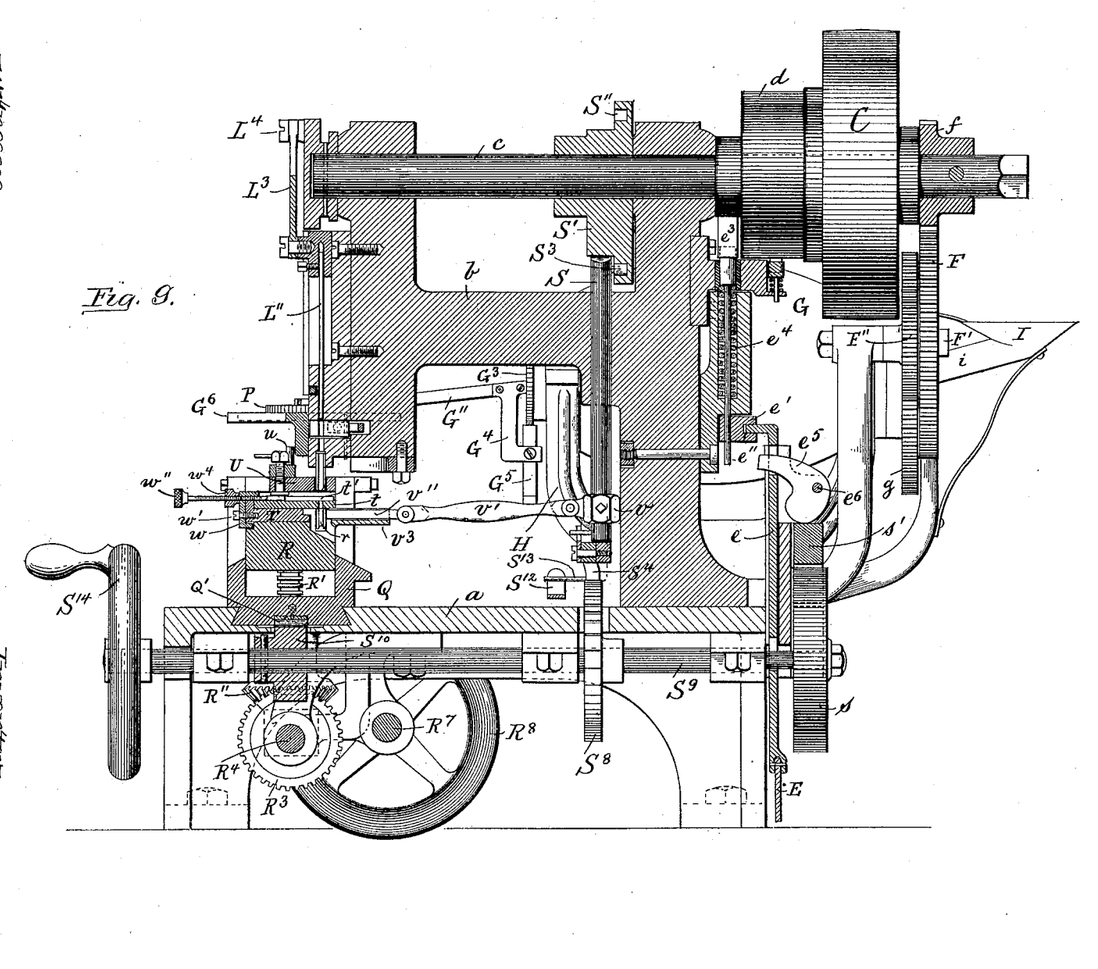
Fig. 9 represents an enlarged sectional view on the line W W, shown in Fig. 2.
Figures 13, 14, 16, 17, 18, 19:
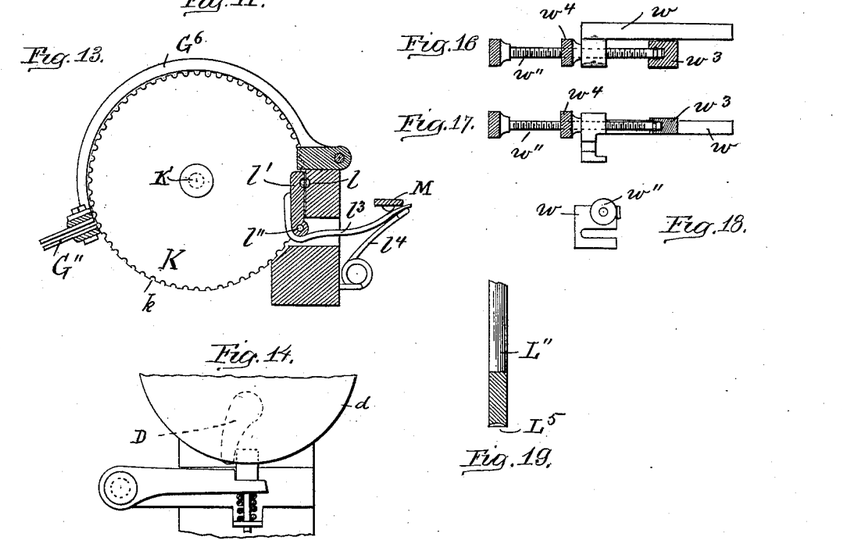
Fig. 13 represents a bottom view of the nail-receiving wheel, showing in section the pivoted gate for receiving the nail previous to its being driven.
Figs. 14 and 15 represent detail views of the driving-shaft releasing mechanism.
Figs. 16, 17, and 18 represent detail side and end views of the gages for holding the brush while being nailed.
Fig. 19 represents a detail longitudinal section of the driver by which the nails are driven.
Figure 15:
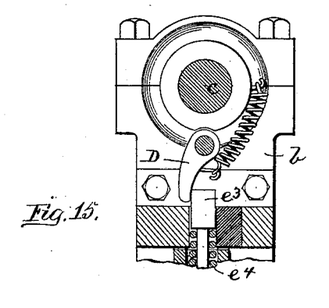
Figure 20:
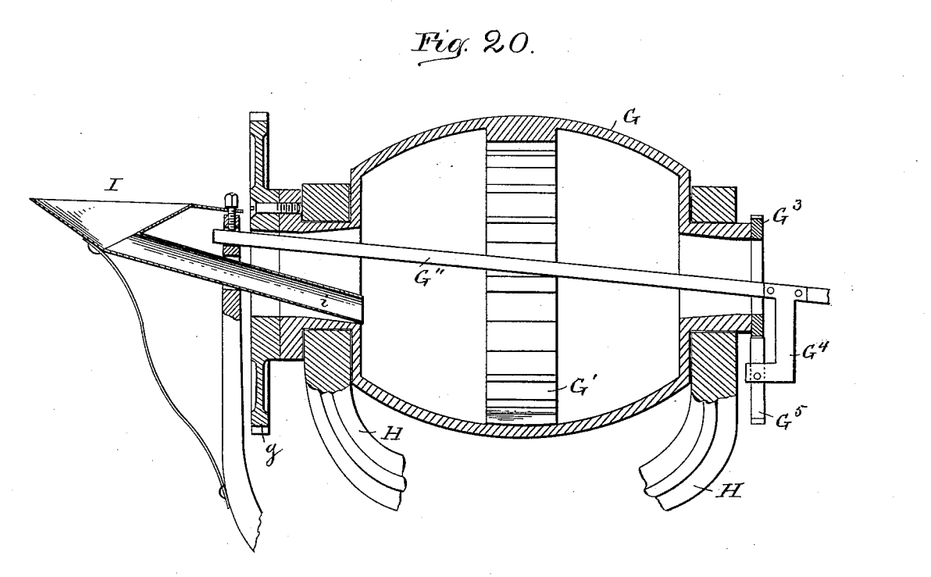
Fig. 20 is a detail longitudinal sectional view of the nail-receiving drum and its bearings.

E, Fig. 9, represents a rod suitably connected in its lower end to a treadle-lever, (not shown in the drawings,) which rod is connected to a bar $e$, the upper end of which is suitably connected to a block $e'$, secured to the lower end of a vertical rod $e''$, having a projection $e^3$ in its upper end, which is normally held by the influence of a spring $e^4$ against the clutch-pawl D when the machine is at rest, as shown in Figs. 9, 14, and 15. When starting the machine it is only necessary to depress the rod E and withdraw the projection $e^3$ from the clutch-pawl D, when the pulley C and shaft $c$ are connected together, causing the rotary motion from the said pulley to be imparted to the shaft $c$.

Figure 4:
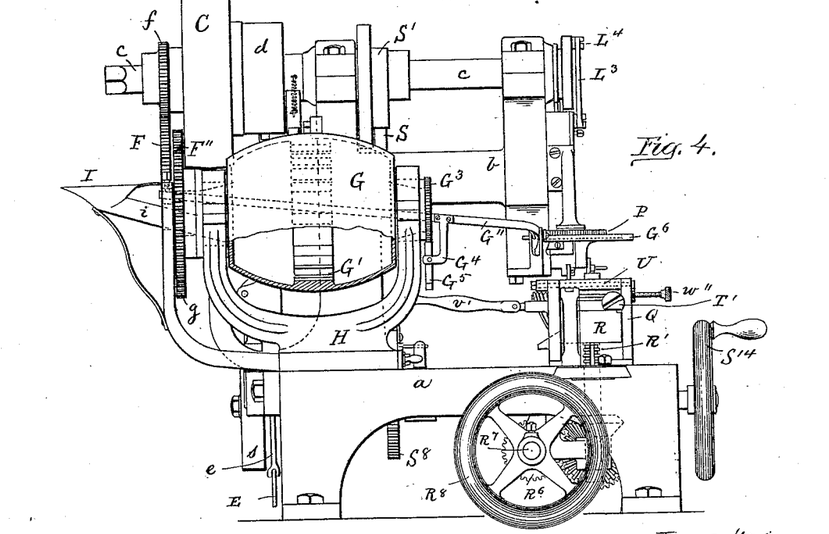
Fig. 4 represents a similar end elevation seen from Y in said Fig. 2.
Figure 5:
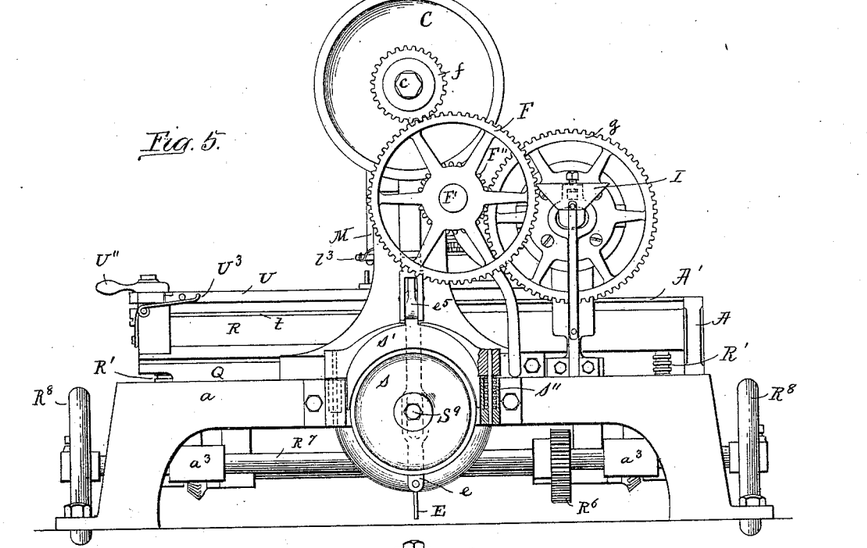
Fig. 5 represents a rear view.

To the driving-shaft $c$ is secured a pinion $f$, the teeth of which mesh in the teeth of the gear F, secured to the intermediate shaft F', and to the latter is secured a pinion F'', the teeth of which mesh in the teeth of the gear $g$, that is secured in a suitable manner to the nail-receiving drum G, the ends of which are journaled in bearings H. (Shown in Figs. 2 and 4.) It will thus be seen that a rotary motion is conveyed to the drum G from the shaft $c$ when the latter is rotated.

The ends of the drum have hollow trunnions journaled in suitable brackets H, as is common in nailing-machines, the nails being fed from time to time into the said drum by means of a stationary hopper I, having a chute $i$ leading to the interior of the said drum G.

On the interior of the nail-receiving drum G are hooks or projections G' G' for the purpose of lifting the nails and delivering them point downward between the stationary inclined raceway G'', which latter is made in the usual manner, composed of two plates or bars held at a proper distance apart, so as to receive the nail-shanks freely, with the heads of the nails resting on the upper edge of the said raceway.

Figure 11:
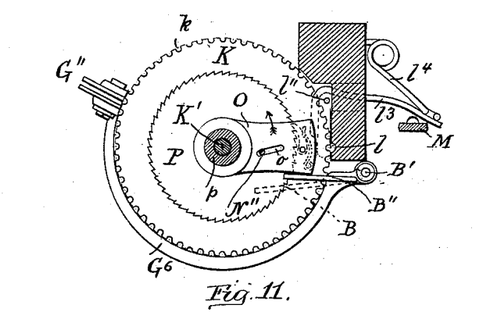
Fig. 11 represents a detail plan view of the nail-receiving wheel.

For the purpose of preventing the nails from clogging or sticking in the raceway while being fed to the nail-receiving wheel, I provide the machine with an automatic raceway vibrator, which is composed of a toothed wheel $G^3$, secured to the forward end of the drum G and made to rotate with the latter, and to the raceway is secured a projection $G^4$, to which is attached a spring or pawl piece $G^5$, the upper end of which engages with the toothed wheel $G^3$, causing a shaking or vibratory lateral movement to be imparted to the raceway, thus causing the nails to be gradually fed downward to the nail-receiving wheel K. The said wheel K is loosely journaled on a pin K', as shown in Figs. 8, 11, and 13, in a suitable manner, so as to be capable of an intermittent rotary motion, and it has on its periphery vertical grooves or notches $k$ $k$, adapted to receive the nails delivered to it from the raceway G'', as shown in Figs. 11 and 13.

To the lower end of the raceway G'' is secured a metal band or guard $G^6$, partially surrounding the nail-wheel K, between which and the guard the nails are intermittently fed into the semicircular lower end $l$ of the driver-tube L, as shown in Figs. 8, 9, 11, and 13, which, after receiving a nail, is closed by a hinged door or gate $l'$, pivoted at $l''$, Fig. 13. The said gate $l'$ has attached to it an arm 13, on the outer end of which presses a spring 14, which causes the gate $l'$ to swing open for the reception of a nail when the arm 13 is released.

Figure 8:
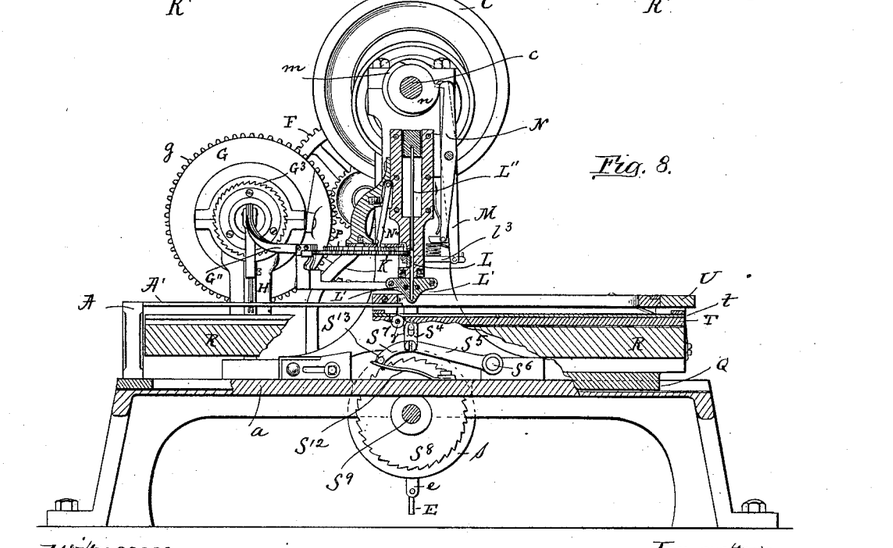
Fig. 8 represents a vertical section of the machine on the center of the driving-tube.

The arm 13 is held in a closed position (shown in Figs. 11 and 13) by means of a lever M, pivoted to the forward end of the frame $b$, and having a rocking motion imparted to it by means of a cam $m$, secured to the shaft $c$, as shown in Fig. 8. I do not wish to confine myself to any particular cam for this purpose; but in practice I prefer to use a face-cam to actuate the said lever M in one direction and to force it in an opposite direction by means of a suitable spring, as is common in machinery, it being only essential that a reciprocatory opening and closing movement should be imparted to the gate $l'$ from the rotary driving-shaft $c$ or its connections to permit one nail at a time to enter the nail-tube previous to its being driven.

Figure 10:
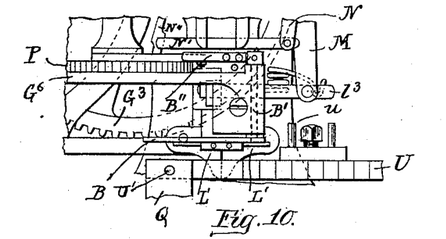
Fig. 10 represents a detail front view of a portion of the nail-receiving wheel and connections.

To the lower end of the nail-tube L are pivoted spring-pressed centering-jaws L' L', as shown in Figs. 8 and 10, as is common in nail-driving machines.

L'' is the driver, the upper end of which is secured to a block, to which is pivoted the link $L^3$, having its upper end pivoted to a crank $L^4$ on the driving-shaft $c$, as shown in Figs. 1, 3, 4, 7, and 9, by which an up-and-down motion is imparted to said driver from the shaft $c$. The lower end of the driver-bar is preferably made concave or cup-shaped, as shown at $L^5$ in Fig. 19, for the purpose of receiving the upper end of the nail-head, and thus causing the nail to be driven with greater precision and in an axial line with the driver.

Figure 12:
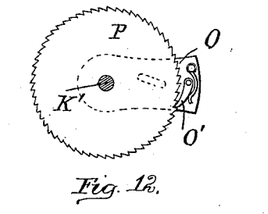
Fig. 12 represents a detail bottom view of the ratchet and pawl for operating the same.

An intermittent rotary motion is imparted to the nail-wheel for the purpose of intermittently feeding the nails into the driving-tube below the driver-bar, said rotary motion being imparted to the nail-wheel K from the driving-shaft $c$, as follows: On the driving-shaft is secured a cam $n$, which actuates a lever N, pivoted to the front end of the head or frame $b$, and to the lower end of said lever is connected one end of a horizontal bar N', the other end of which is connected to or actuates a bar N'', pivoted in its upper end to the head or frame $b$ and having its lower end projecting into an inclined slot $o$, Fig. 11, in the pawl-carrier O, which is loosely journaled on the hub $p$ of the ratchet-wheel P, which is arranged concentric with and secured to the top of the nail-wheel K, as shown in Fig. 11. The pawl-carrier O has pivoted to its outer end a spring-pressed pawl O', Fig. 12, which imparts an intermittent rotary motion to the ratchet-wheel P and nail-wheel K as the pivoted arm N'' is vibrated. The cam $n$ imparts a rocking motion to the parts N and N'' in one direction, and return motions are preferably imparted to said parts by means of suitable springs. (Shown in Fig. 8.)

Q is the longitudinally-movable carriage that carries the brush to be nailed, which carriage is longitudinally movable in guides in the base $a$, as shown in Fig. 9. In said carriage is vertically adjustable (but not longitudinally movable) the bed R, which latter is raised and lowered for the purpose of clamping the brush to be nailed firmly between the brush-rest and clamping-plate above it, as will hereinafter be described.

Figure 6:
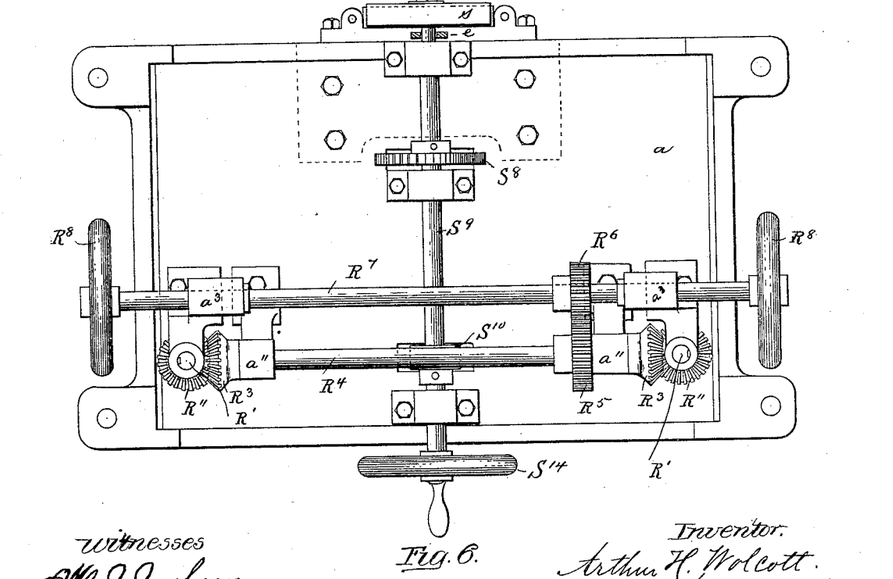
Fig. 6 represents a bottom view of the machine.
Figure 7:
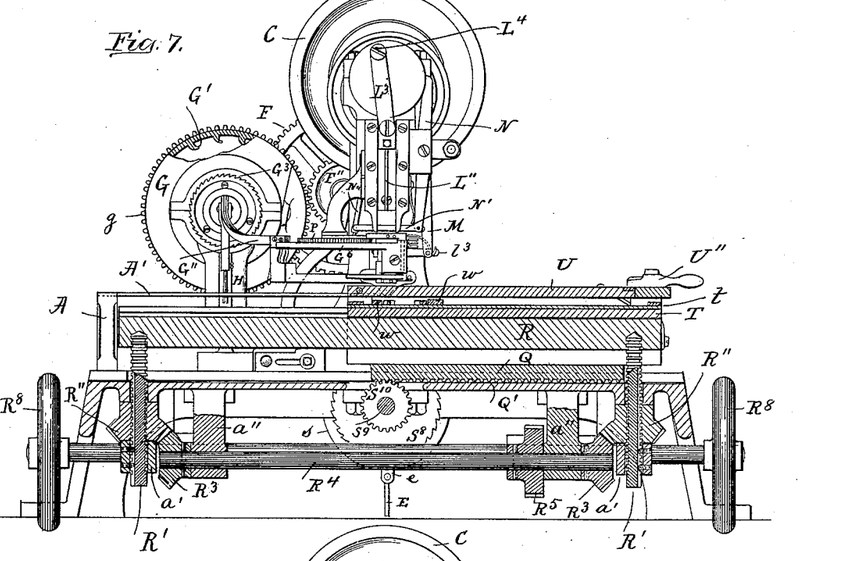
Fig. 7 represents a longitudinal section on the line Z Z, shown in Fig. 2.

The mechanism for raising and lowering the said bed R is constructed as follows: To the under side of the bed R are secured the downwardly-projecting screw-rods R' R', which are guided in bearings $a'$ $a'$ on the under side of the base $a$, as shown in Fig. 7, and the said screw-rods are prevented from turning around their axis by being splined in a suitable manner in said bearings. On each of said screws R' is located a centrally screw-threaded bevel-gear R'', the teeth of which mesh into the teeth of a bevel-gear $R^3$, secured to a horizontal shaft $R^4$, journaled in bearings $a''$ $a''$, secured to the under side of the base $a$, as shown in Fig. 7. To the shaft $R^4$ is secured a spur-gear $R^5$, the teeth of which mesh into the teeth of a similar spur-gear $R^6$, Fig. 6, secured to a shaft $R^7$, journaled in bearings $a^3$ $a^3$ on the under side of the base $a$, and to the ends of said shaft $R^7$ are secured cranks or hand-wheels $R^8$ $R^8$, by which arrangement a vertical adjustment of the bed R is obtained simply by turning the hand-wheel shaft R⁷ to the right or left, as the case may be.

An intermittent longitudinal feed motion is automatically imparted to the carriage Q from the driving-shaft by the following intermediate mechanism: In a bearing in the frame $b$ is located a vertical plunger S, which is forced downward by means of a cam S', secured to the shaft $c$, Fig. 9. Said cam has a path-groove S'', adapted to receive a pin (or pin and roll) $S^3$ on the upper end of the plunger S for the purpose of raising said plunger after it has been depressed by the cam S'. To the lower end of the plunger S is connected a slotted link $S^4$, Fig. 8, which is pivoted to a pawl-lever $S^5$, hinged in one end at $S^6$ to the base $a$, and having pivoted to its free end the pawl $S^7$, adapted to engage in the teeth of the ratchet-wheel $S^8$, that is secured to a shaft $S^9$, located in bearings on the under side of the base $a$, and to said shaft is secured a pinion $S^{10}$, the teeth of which mesh in a toothed rack Q', secured to the under side of the sliding carriage Q, as shown in Fig. 7. A spring $S^{12}$, secured to the base $a$ and having its free end pressing upward against a pin or side projection $S^{13}$ on the pawl $S^7$, serves to raise the latter from engagement with the ratchet-wheel $S^8$ when the machine is at rest to enable the carriage Q to be moved by hand to its original position after a brush has been nailed, and for this purpose the shaft $S^9$ has attached to its forward end a crank or hand-wheel $S^{14}$, as shown in Figs. 1, 2, 3, 5, 6, and 9.

For the purpose of regulating the feed of the carriage Q and preventing it from being thrown by its momentum beyond the regular and desired distance of feed, I secure to the rear end of the feed-shaft $S^9$ a circular disk $s$, above which is located a brake-shoe or friction-plate $s'$, normally held from contact with said disk $s$ by means of springs $s''$ $s''$. (Shown in Fig. 5.) To the starting-bar $e$ is suitably connected a cam or knee lever $e^5$, Figs. 5 and 9, which, when the treadle-rod E is depressed for starting the machine, causes the said cam to be turned on its fulcrum $e^6$ sufficiently to depress the friction-shoe $s'$, so as to hold it with the desired frictional resistance against the upper portion of the disk $s$, for the purpose as stated.

On top of the bed R is supported a plate T, which is vertically adjustable with the said bed, but is connected in a suitable manner at its ends to the carriage Q, preferably by means of headed screws T' T', as shown in Figs. 1, 3, 4, and 5, so that while it is adjustable vertically with the bed R it follows the carriage as the latter is moved horizontally on the base $a$.

Figure 1:
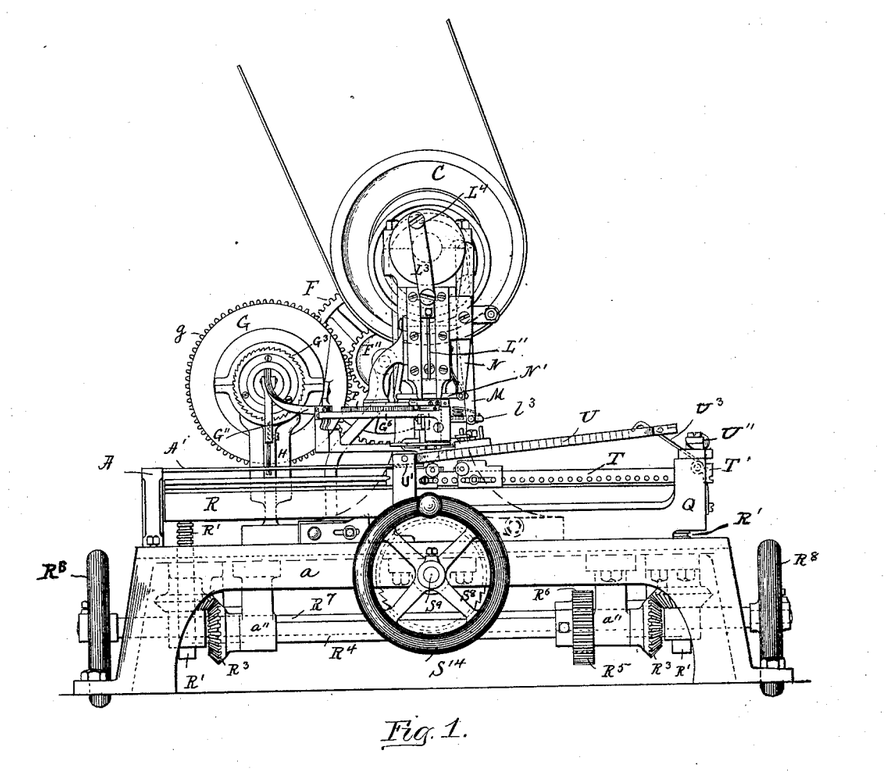
Figure 1 represents a front elevation of the machine.
Figure 2:
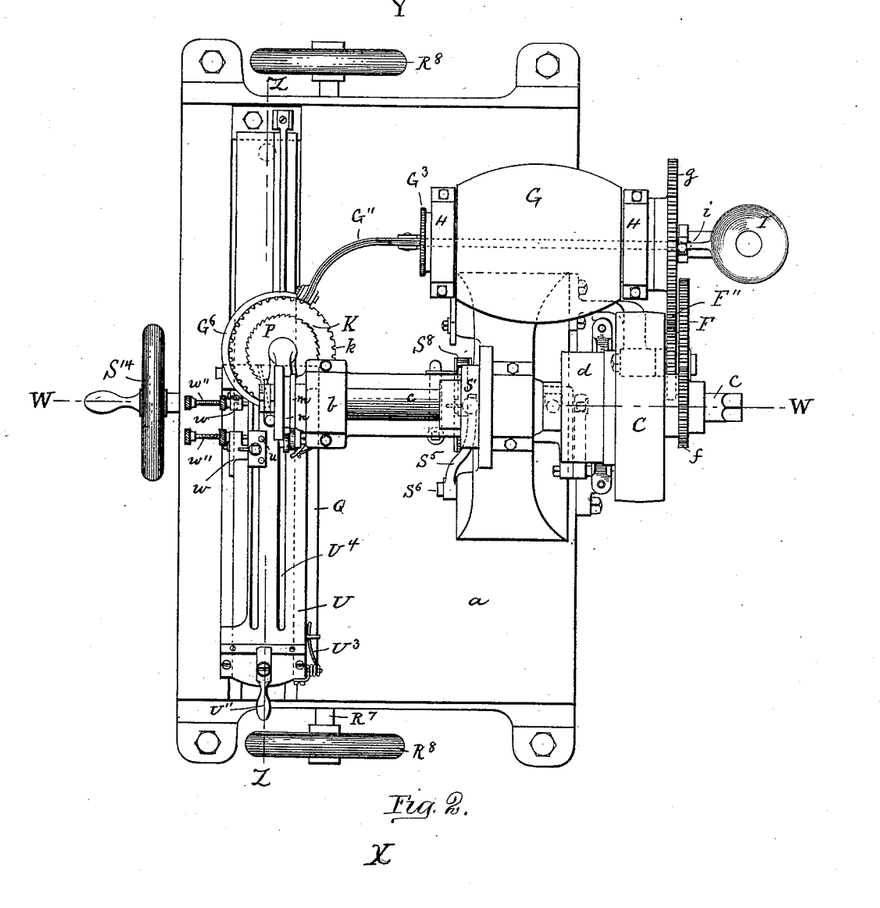
Fig. 2 represents a plan view of the same.
Figure 3:
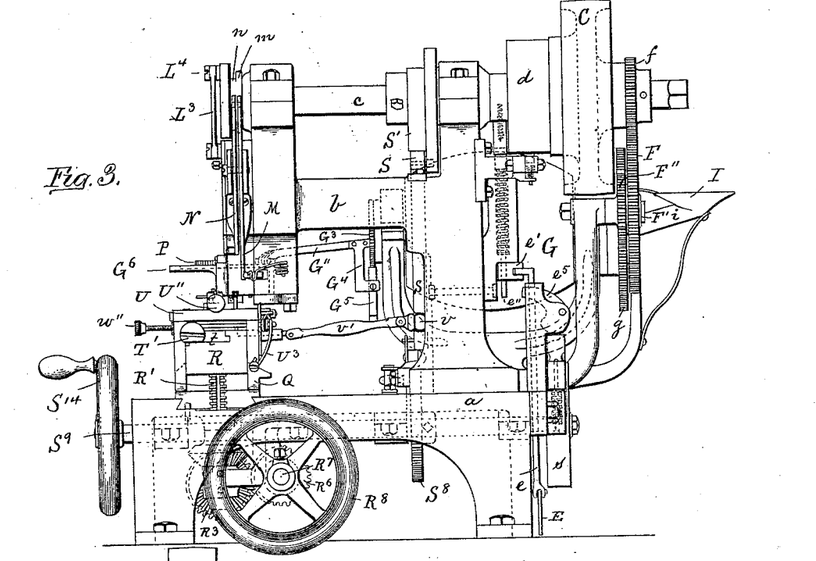
Fig. 3 represents an end elevation seen from X in Fig. 2.

To the top of the plate T is secured the brush-supporting plate $t$, on which the brush is secured while it is being nailed. The plate $t$ has a longitudinal groove $t'$ (shown in section in Fig. 9) to receive the ends of the nails if the latter are long enough to pass entirely through the brush and below the same. The brush is confined in place on the plate $t$ by means of the clamping plate or bar U, which is pivoted at U' to the carriage Q and held in a clamped position relative to the latter by means of a latch or cam-lever U'' at one end of the said carriage, as shown in Figs. 1, 2, 5, and 7. A spring $U^3$, Figs. 1 and 5, serves to automatically raise the clamping-plate U to the position shown in Fig. 1 to enable the brush that is to be nailed to be inserted between the plates $t$ and U and to remove it from the latter after being nailed. The clamping-plate U has a slot $U^4$, into which the lower ends of the centering-jaws L' L' project, as shown in Figs. 2 and 8.

In nailing brushes the nails may be either of a length to pass partially through the brush or wholly through the same to permit the projecting ends to be clinched on the under side of the brush. In the latter case it is desirable that the nails should be cut off equally, so as to leave uniform clinching ends, and for this purpose I provide the machine with an automatic cutting device (shown in Figs. 3 and 9) which is constructed as follows: On the plunger S is adjustably secured a block $v$, to which is pivoted a link $v'$, the forward end of which is connected to the cutter-bar $v''$, adapted to slide forward and back in a stationary guide $v^3$ at a right angle to the line of feed of the carriage Q. The upper side of the cutter $v''$ moves in close contact with the under side of the brush-supporting plate $t$, thus causing such part of the nail that projects through and below the slotted rest $t$ to be cut off, leaving a length of nail equal to the thickness of the plate $t$ projecting below the brush for clinching purposes.

On the bed R is pivoted a small wheel or roller $r$, which serves to turn over and clinch the nail ends projecting below the nailed brush as the latter is moved over such roller or stationary projection.

For the purpose of preventing the nail-heads from working upward during the clinching operation, I secure to one end of the base $a$ or other stationary part of the machine a post A, to which is secured a horizontal metal bar A', the free end of which rests against the under side of the clamping-bar U, and by this arrangement I obtain an upper support for the nail-heads during the clinching operation.

It is essential that the brush to be nailed should be placed in proper position on the plate $t$, and for this purpose I use a pair of adjustable gages, as shown in detail in Figs. 16, 17, and 18, between which the brush is placed previous to clamping it by means of the clamping-bar U. Each of such gages consists of an angular bracket $w$, which is adjustably secured to the front of the plate T by means of a set-screw $w'$, passing through a slot in the face of said bracket and screwed into a screw-threaded perforation in said plate T. $w''$ is a regulating-screw screwed through the angular part of the bracket $w$, and having loosely journaled on its inner end a block $w^3$, as shown in Figs. 16 and 17. $w^4$ is a check-nut on the regulating-screw $w''$, as shown. According to the width of the brush to be nailed, the brackets $w\ w$ are secured at a corresponding distance apart, after which the block $w^3$ on each gage is moved by its screw $w''$ to such a position relative to the bracket $w$ that such blocks shall serve as stops for the end of the brush-ferrule when placed in the desired position on the plate $t$ for nailing it.

It is desirable in a machine of this kind that the nail-carrying wheel should be automatically stopped after the brush has been nailed its entire width, so as to prevent unnecessary waste of nails, and for this purpose I secure to the clamping-plate U in an adjustable manner a projection $u$, which, as the carriage Q reaches the end of its feed, (according to the width of the ferrule that is being nailed,) comes in contact with a lever B. (Shown in Figs. 1, 7, and 10 and in dotted lines in Fig. 11.) Said lever is attached to the lower end of a vertical pin B', journaled in the nail-wheel guard $G^6$, and to the upper end of said pin is attached a spring B'', that lies in contact with the front edge of the pawl-carrier O, Fig. 11. As the projection $u$ comes in contact with the lever B it causes the spring B'' to move the pawl-carrier O in the direction of the arrow shown in Fig. 1 sufficiently to hold the arm or lever N'' in its outer position, (shown in Figs. 8 and 11,) thus allowing the lever N to rock without imparting motion to said lever N'' and pawl-carrier O, by which the nail-carrying wheel K is held stationary, for the purpose set forth.

The operation of the invention is as follows: The gages $w\ w$ are secured at a proper distance apart on the longitudinally-movable plate $t$ and adjusted according to the height and width of the brush-ferrule to be nailed, as described, after which the brush is placed between said gages and secured in position on the plate $t$ by means of the clamping plate or bar U. The vertical pressure on the brush is regulated by raising the bed R more or less, as described. The machine is then set in operation by depressing the rod E, causing the dog D to be liberated from the projections $e^3$ on the spring-pressed rod $e''$ and causing the rotary motion of the pulley C to be conveyed to the driving-shaft $c$, as described. The rotation of the shaft $c$ causes a rotary motion to be imparted to the nail-drum G by means of the gearing described and causes the nails in the said drum to be delivered to the raceways G'' and conveyed to the intermittently rotary nail-receiving notched wheel K between it and the guard $G^6$ and from said notched wheel to the driver-tube, where the nail is temporarily held by the grooved gate $l'$, which is automatically opened and closed by mechanism substantially as above described, so as to deliver one nail at a time to the nail-tube. The driver then descends and drives the nail between the expansive nail-centering dies L' L', through the perforation in the clamping-bar U, and through the ferrule and brush resting on the plate $t$, the lower end of the nail being driven through the longitudinal slot in said plate $t$ and cut off even with the bottom of the latter by the reciprocating cutter $v''$. After the nail has been driven and its lower end cut off the carriage Q is intermittently and automatically moved toward the left by means of the cam S' and intermediate connecting mechanism to the rack Q' on said carriage, by which the brush is fed a distance equal to the space desired between the nails, and during such feed the projecting lower end of the driven nail is turned over and clinched by the roller or projection $r$, as described. After the carriage (and brush held thereon) has been fed the distance desired between the nails it comes to a stop to permit another nail to be driven and clinched, and so on until the projection $u$ comes in contact with the arm B, causing the supply of nails to the nail-tube to be cut off, when the operator stops the machine by relieving the downward pressure on the rod E. The spring $S^{12}$ raises the pawl $S^7$, Fig. 8, out of the ratchet-wheel $S^8$, enabling the operator to move the carriage Q, by means of the crank-wheel $S^{14}$, back to its original position, after which the clamp-plate U is released, the new nail-brush removed, and another put in its place to be nailed, and so on.

Having thus fully described the nature, construction, and operation of my invention, I wish to secure by Letters Patent, and claim—

1. In a nailing-machine, the combination of a rotary nail-drum having interior hooks or ledges, hollow bearings supporting said drum, a hopper entering the drum through one of the bearings, and a raceway passing out through the other bearing, substantially as described.

2. In a nailing-machine, the combination, with an intermittently-rotating notched nail-receiving disk and an inclosing-band around said disk, of the gate $l'$ and the lever M, for retaining the gate in its closed position, substantially as described.

3. In a nailing-machine, a horizontally and intermittently movable carriage, a laterally-movable cutter-bar, a supporting-plate on said carriage, having a longitudinal slot therein, across which the cutter moves, and intermediate connecting mechanism, substantially as described, from the driving-shaft to the carriage and cutter-bar, as set forth.

4. In a nailing-machine, an intermittently and horizontally movable carriage having a rack, a feed-shaft having a pinion meshing in said rack, and a ratchet-wheel, as described, combined with a rotary cam on the driving-shaft, a plunger-rod connected to it, and a jointed pawl-lever having a side projection and a spring for automatically raising the pawl from contact with the ratchet-wheel, substantially as and for the purpose set forth.

5. In a nailing-machine, a vertically-movable driver-bar, a vertically-adjustable bed, and a horizontally and intermittently movable carriage having a slotted brush-supporting-plate connected to it, combined with a laterally-movable cutting-bar, a clinching roller or projection, and a stationary supporting-bar for the purpose of preventing the nails from being pushed upward during the clinching operation, substantially in the manner as specified.

6. In a nailing-machine, the combination, with the vertically-reciprocating driver-bar and the carriage below said bar, of the pawl lever $S^5$, normally out of connection with the ratchet-wheel $S^8$, whereby the carriage is given an intermittent motion in one direction and may be returned to its initial point at will, substantially as described.

In testimony whereof I have signed my name to this specification, in the presence of two subscribing witnesses, on this 19th day of December, A. D. 1889.

ARTHUR H. WOLCOTT.

Witnesses:
 ALBAN ANDRÉN,
 MARTHA J. JACKSON.